(12) United States Patent
Kuhn et al.

(10) Patent No.: US 9,731,591 B2
(45) Date of Patent: Aug. 15, 2017

(54) HEAT TRANSFER AIRFLOW THROUGH ENGINE COMPARTMENT

(71) Applicant: CNH Industrial America LLC, New Holland, PA (US)

(72) Inventors: Frederic George Kuhn, Kiel, WI (US); Kevin L. Weihing, Chilton, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/137,741

(22) Filed: Apr. 25, 2016

(65) Prior Publication Data

US 2016/0318387 A1 Nov. 3, 2016

Related U.S. Application Data

(60) Provisional application No. 62/153,811, filed on Apr. 28, 2015.

(51) Int. Cl.
*B60K 11/04* (2006.01)
*B60K 13/02* (2006.01)

(52) U.S. Cl.
CPC ............ *B60K 11/04* (2013.01); *B60K 13/02* (2013.01); *B60Y 2200/22* (2013.01)

(58) Field of Classification Search
CPC ......... B60K 11/02; B60K 11/04; B60K 11/06; B60K 11/08; B60K 13/02; B60K 13/06; B60Y 2200/22
USPC .............................. 180/68.1, 68.2, 68.3, 68.4
See application file for complete search history.

(56) References Cited

U.S. PATENT DOCUMENTS

| | | | |
|---|---|---|---|
| 4,291,911 A | | 9/1981 | Gallmeyer |
| 4,976,489 A | | 12/1990 | Lovelace |
| 5,143,516 A | * | 9/1992 | Christensen ........... B60K 11/08 123/41.44 |
| 5,269,264 A | * | 12/1993 | Weinhold ............... B60K 11/00 123/198 E |
| 5,724,925 A | * | 3/1998 | Ito .......................... B60K 11/02 123/41.49 |
| 6,230,832 B1 | | 5/2001 | von Mayenburg et al. |
| 6,832,644 B2 | | 12/2004 | Stauder et al. |
| 7,051,786 B2 | | 5/2006 | Vuk |
| 7,055,638 B2 | | 6/2006 | Khalighi et al. |
| 7,143,852 B2 | | 12/2006 | Yatsuda et al. |

(Continued)

OTHER PUBLICATIONS

Publisher: NewsRx; "Split Flow Exhaust Deflector" Trade Journal Politics & Government Week: pp. 1-3, (Oct. 31, 2013): US.

*Primary Examiner* — John Walters
(74) *Attorney, Agent, or Firm* — Rebecca L. Henkel; Rickard K. DeMille

(57) ABSTRACT

A system is provided for directing airflow through an engine compartment of an off-road agricultural vehicle. The system may include an air dam that, in conjunction with an engine face, provides flow-directing baffling in the engine compartment that directs heated air from a radiator out discharge openings through side walls of a hood that covers the engine compartment. The air dam facilitates forcing heated air from the radiator sideways out the discharge openings of the hood, significantly reducing or preventing a radiator fan from pushing hot air to flow across the components of the rear engine compartment area, including preventing flow across a majority of air inlet components and engine surfaces that are rearward of the front engine face.

18 Claims, 4 Drawing Sheets

(56) References Cited

U.S. PATENT DOCUMENTS

| | | |
|---|---|---|
| 7,182,047 B1 | 2/2007 | Schwartz |
| 7,451,844 B2 * | 11/2008 | Kunikata ............... B60K 11/04 180/68.1 |
| 7,686,382 B2 | 3/2010 | Rober et al. |
| 8,312,949 B2 | 11/2012 | Hirukawa et al. |
| 8,434,579 B2 | 5/2013 | Widmer et al. |
| 8,479,852 B2 | 7/2013 | Maurer et al. |
| 8,579,358 B2 | 11/2013 | Meeks et al. |
| 8,708,075 B2 | 4/2014 | Maurer et al. |
| 8,887,845 B2 | 11/2014 | McDonald et al. |
| 2011/0181075 A1 | 7/2011 | Glickman |
| 2013/0248141 A1 | 9/2013 | Maurer et al. |
| 2013/0341110 A1 | 12/2013 | Butlin, Jr. |

* cited by examiner

HEAT TRANSFER AIRFLOW THROUGH ENGINE COMPARTMENT

CROSS REFERENCE TO RELATED APPLICATIONS

This is a non-provisional application based upon U.S. provisional patent application Ser. No. 62/153,811, entitled "Heat Transfer Airflow Through Engine Compartment," filed Apr. 28, 2015, which is incorporated herein by reference.

FIELD OF THE INVENTION

The invention relates generally to agricultural product application equipment such as self-propelled sprayers and in particular, to a system for directing airflow through an engine compartment of an off-road agricultural vehicle.

BACKGROUND OF THE INVENTION

EPA Tier 4 emission standards have driven diesel engine manufacturers to develop various methods and processes to achieve compliance. Some of these compliance methods have increased engine heat energy rejection. Discharge gas recirculation is the main supply of additional heat energy. The discharge must be cooled before re-introduction to the intake manifold. Additionally as self-propelled sprayers get larger, the power requirements to operate the spray systems and other accessories have correspondingly increased. To meet these increasing power requirements, engines in self-propelled sprayers are also getting larger. Larger engines require larger engine-cooling systems to deal with the additional heat created by the larger engines. Heat radiated directly from these larger engines and heated air that is produced by pulling air across the radiator with a tan can together contribute to high engine compartment temperatures. High temperatures and airflow in the engine compartment cause heating of the various components as well as the engine itself Additionally, heated an in the intake system and an cleaner box changes air density and compromises engine performance and effects emissions.

SUMMARY OF THE INVENTION

A system is provided for directing airflow through an engine compartment. The system may include an air dam that, in conjunction with an engine face, provides flow-directing baffling that directs heated air from a radiator out discharge openings through side walls of a hood that covers the engine compartment. The air dam acts like a deflector plate that significantly reduces or prevents a radiator fan from directing hot airflow from flowing across the components of the rear engine compartment area, including the engine surfaces rearward of the front engine face. In this way, the air dam divides the engine compartment into a radiator airflow compartment and a non-radiator airflow compartment, with the majority of air inlet components of the engine arranged in the relatively cooler non-radiator airflow compartment.

According to another aspect of the invention, the air dam directs airflow from the radiator fan shroud down away from the top wall of a hood and transversely out discharge openings of opposite side walls of the hood.

The air dam is mounted in the engine compartment with its front portion connected to the top of the fan shroud. The air dam has an upper segment that extends from the fan shroud over at least a portion of the engine and may have side segments that extend angularly downward from the upper segment, straddling the engine or aligned generally in a plane defined by the front face of the engine, arranged toward back edges of the discharge openings of the side walls of the hood.

According to another aspect of the invention, a system is provided for directing airflow through an engine compartment of an off-road agricultural vehicle. The system includes an engine compartment. An engine is arranged in the engine compartment delivering power for use by the off-road agricultural vehicle. A radiator is arranged in the engine compartment and configured to draw cooling air into an intake side of the radiator for transferring heat from the radiator to the cooling air converting the cooling air to heated air released from a discharge side of the radiator facing toward the engine. A radiator discharge chamber may be defined by a space between the engine and the discharge side of the radiator, which is configured to receive the heated air released from the discharge side of the radiator. An air dam may extend between the radiator and the engine. The air dam may define an upper boundary of the radiator discharge chamber and may be configured to vertically contain the heated air below the air dam and block flow of the heated air across an upper portion of the engine or other portions rearward of a front face of the engine.

According to another aspect of the invention, a hood with interconnected walls defines an enclosure of the engine compartment. The interconnected walls of the hood include a pair of side walls with air discharges extending through the side walls. The air discharges may define radiator discharge vents with openings extending through the side walls. The radiator discharge vents of the hood are arranged with respect to the radiator discharge chamber for releasing the heated air out of the radiator discharge chamber through the radiator discharge vents. The radiator discharge chamber may be defined within a radiator airflow compartment that is arranged within the engine compartment. The air dam may define at least a portion of a boundary between the radiator airflow compartment and a non-radiator airflow compartment arranged in the engine compartment. The non-radiator airflow compartment is relatively cooler and houses the majority of air intake and other components that can be negatively influenced by high temperatures.

According to another aspect of the invention, the air dam may include a top wall extending generally perpendicularly from a radiator shroud. The air dam may include an angled wall extending angularly downward and away from a rear portion of the top wall of the air dam. The air dam may include a back wall extending downwardly from the angled wall of the air dam. The back wall of the air dam and a front wall of the engine define a rear boundary of the radiator discharge chamber. The air dam is configured to provide thermal separation between the heated air leaving the radiator and at least portions of an air intake system of the engine.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within, the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
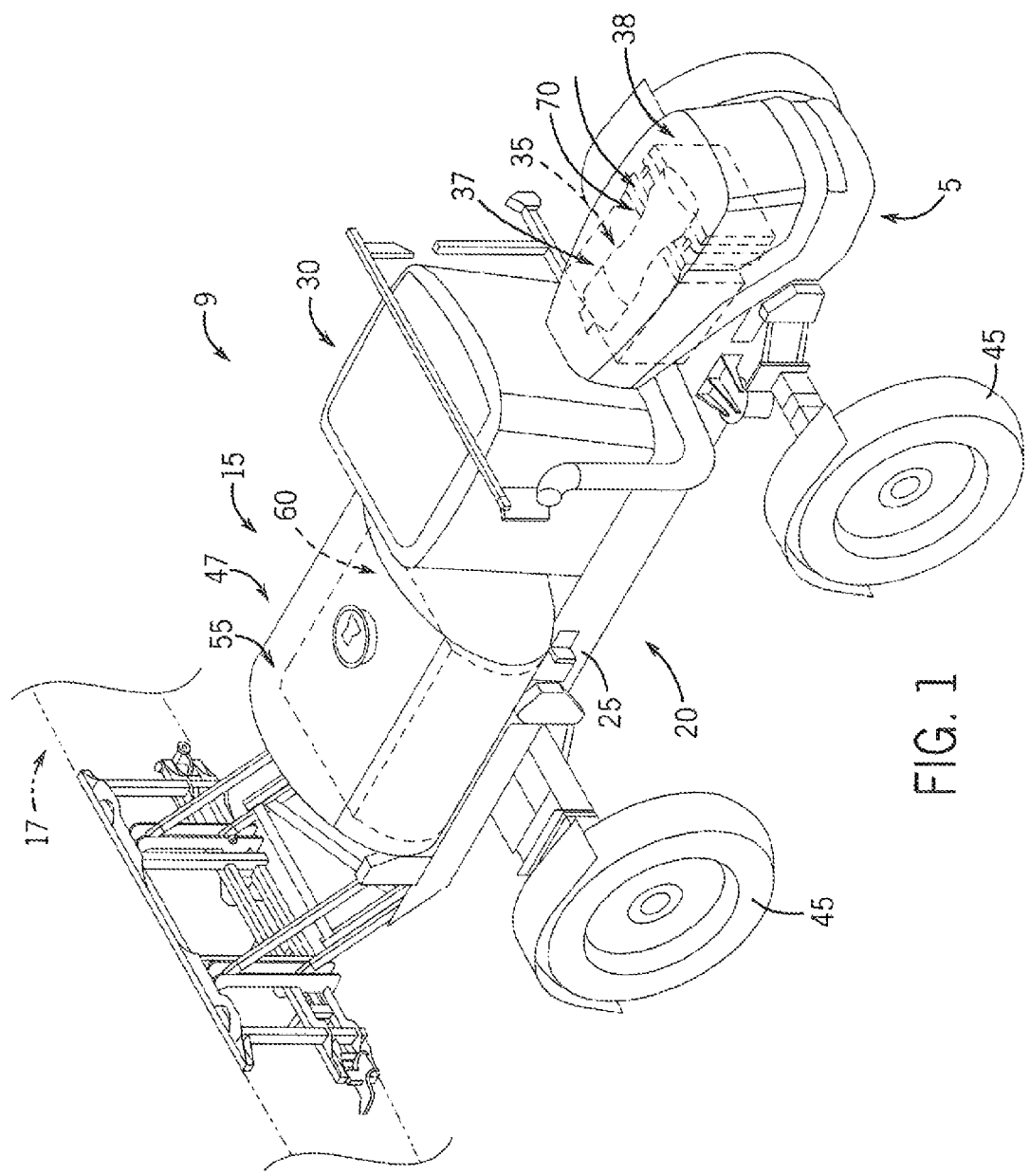
FIG. 1 is a pictorial view of an off-road agricultural vehicle with a system for directing airflow through an engine compartment according to the present invention.

Referring now to the drawings and specifically to FIG. 1, a system for directing airflow through an engine compartment is shown as engine compartment airflow system 5 used here with an off-road agricultural vehicle 9. Off-road agricultural vehicle 9 is represented as an applicator 15, shown here as a rear-boom self-propelled agricultural sprayer vehicle or rear-boom self-propelled sprayer, such as those available from CNH Industrial, such as the Miller Condor Series sprayers and New Holland Guardian Series rear-boom sprayers. Although applicator 15 is shown as a rear-boom, self-propelled sprayer, it is understood that applicator 15 can instead be configured as a dry product spreader with a dry box or spinner box for broadcast-type delivery of dry product. Furthermore, applicator 15 can, instead, be a front-boom sprayer, such as those available from CNH Industrial, including the Miller Nitro and New Holland Guardian Series front-boom sprayers. it is further understood that off-road agricultural vehicle 9 may include other self-propelled implements, tractors, or other off-road agricultural vehicles 9.

Referring again to FIG. 1, applicator 15 includes chassis 20 having chassis frame 25 that supports various assemblies, systems, and components. These various assemblies, systems, and components include boom system 17, cab 30, and engine 35 housed in engine compartment 37 defined inwardly of hood 38. In mechanical drive applications, a mechanical transmission receives power from engine 35 and delivers power for rotating wheels 45 by way of power-transmitting driveline components such as drive shafts, differentials, and other gear sets in portal, drop boxes, or other housings. For hydraulic drive systems, a hydraulic system receives power from engine 35 and includes at least one hydraulic pump which may be in a hydrostat arrangement for providing hydraulic pressure for operating hydraulic components within the hydraulic system, including hydraulic motors that are operably connected to the hydraulic pump(s) for rotating wheels 45. Applicator 15 has a spray system 47 that includes storage containers such as a rinse tank storing water or a rinsing solution and product tank 55 that stores a volume of product 60 for delivery onto an agricultural field with applicator 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height adjustable boom of the boom system 17 for release out of spray nozzles that are spaced from each another along the width of boom during spraying operations of applicator 15.

Still referring to FIG. 1, engine compartment airflow system 5 includes a baffle and seal system 70 configured to direct hot airflow out of the engine compartment 37 along a flow path that is separated from the air intake and other components and other components of engine 35.

Figure 2:
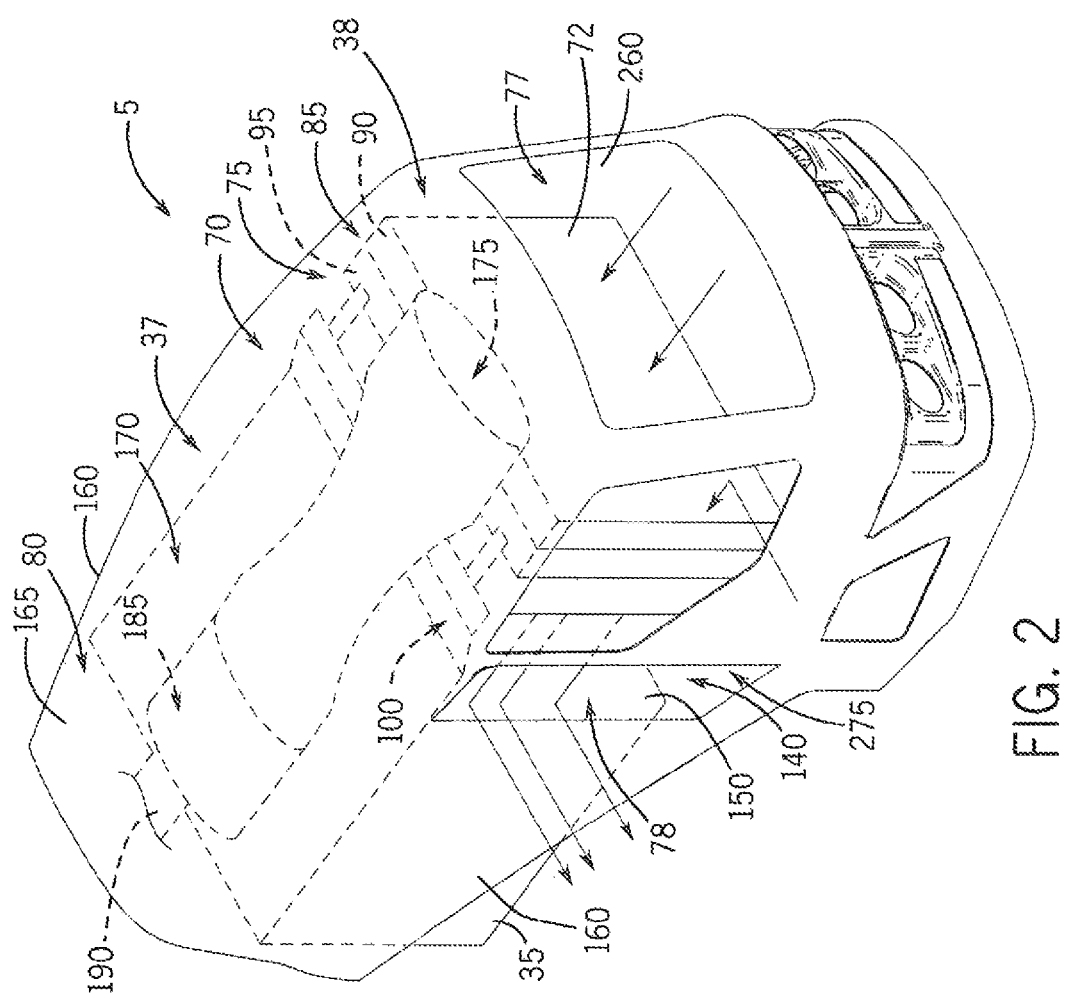
FIG. 2 is a is a pictorial view of a hood used with a system for directing airflow through an engine compartment according to the present invention.

Referring now to FIG. 2, baffle and seal system 70 engages and seals against various inwardly facing surfaces of hood 38 and separates engine compartment 37 into multiple spaces or portions. A front portion of the engine compartment 37 defines a radiator airflow compartment 75 with a cooling air intake passage 77 and a heated air outlet passage 78. A back portion of the engine compartment 37 defines a non-radiator airflow compartment 80. Radiator airflow compartment 75 houses a cooling package 85 that has components configured to transfer heat away from such components to cooling air that flows through the cooling package and is released downstream as heated air. Cooling package 85 separates the cooling air intake passage 77 and heated air outlet passage 78 of the radiator airflow compartment 75. Cooling package 85 is shown having a stacked intercooler 90 for cooling compressed or charged air of a charged air system and radiator 95 for cooling liquid coolant of engine 35. Although the intercooler 90 and the radiator 95 are shown as being stacked from front to rear, in alternative aspects, the intercooler 90 and the radiator 95 may be arranged differently, such as being stacked vertically so that the intercooler 90 and the radiator 95 may each receive cool intake air, as opposed to preheated air from an up air stream heat exchanger.

Figure 3:
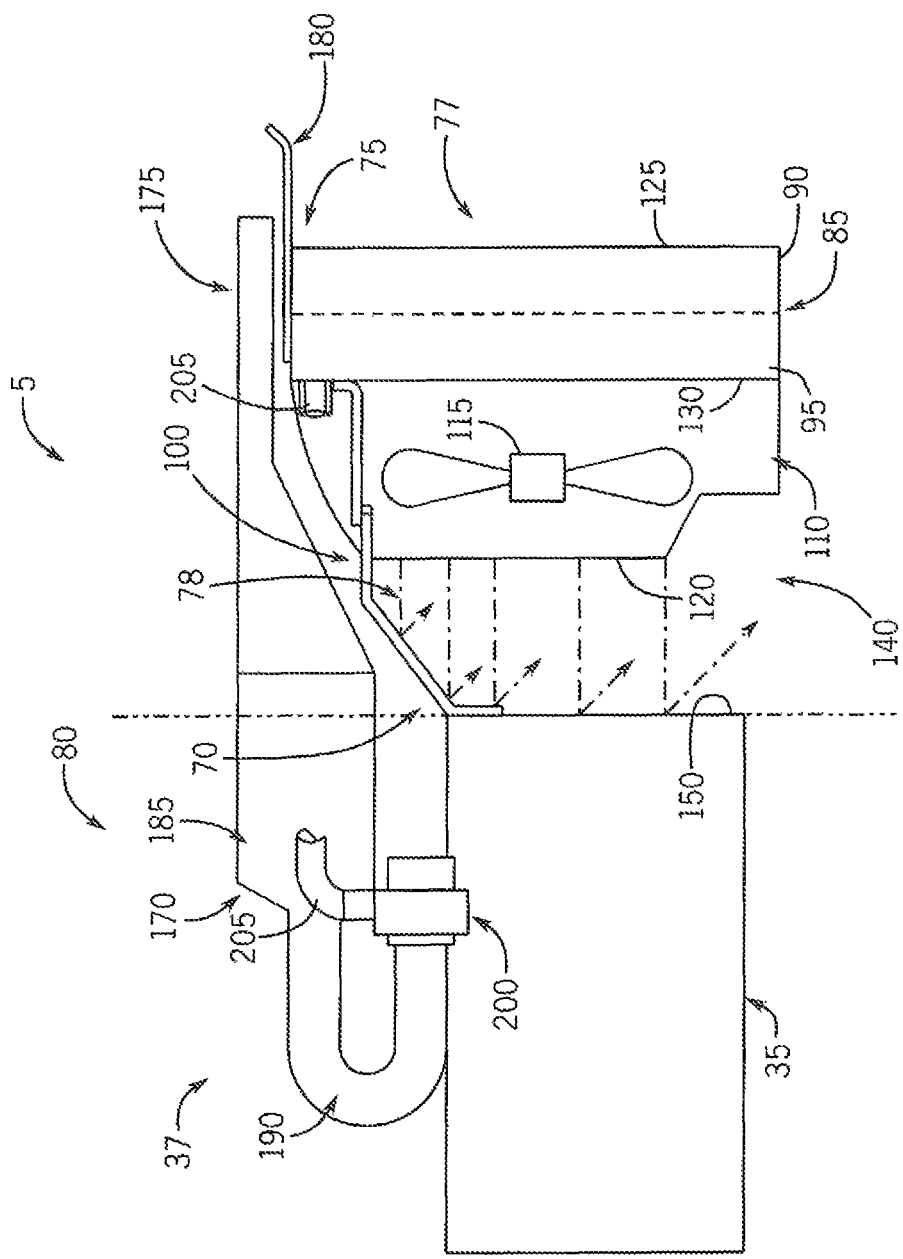
FIG. 3 is a simplified partially schematic side elevation view of a system for directing airflow through an engine compartment according to the present invention.

Referring now to FIG. 3, baffle and seal system 70 includes air dam 100 connected to and extending rearwardly of fan shroud 110 that is attached to radiator 95 and encloses fan 115 that is aligned with an opening 120 of fan shroud 110. Fan 115 pulls cooling air into the cooling package 85 through an intake side 125 of cooling package 85 and out of a discharge side 130 of cooling package 85 as heated air through the shroud opening 120. The heated air is released from shroud opening 120 into a radiator discharge chamber 140 defined by the heated air outlet passage 78 within the radiator airflow compartment 75 of the engine compartment 37.

Still referring to FIG. 3, air dam 100 defines an upper boundary of the radiator discharge chamber 140 and is configured to vertically contain the following heated air below the air dam 100 and serves as a deflector plate or barrier that blocks flow of the heated air across an upper portion of the engine 35. A front surface or face 150 of engine 35 defines a rear boundary of the radiator discharge chamber 140, which may include a seal arrangement (not shown) sealing a gap(s) between outer edges of the engine face 150 and inwardly facing surfaces of respective portions of hood 38 (FIG. 2), such as pair of side walls 160 that extend downwardly from an upper wall 165 of hood 38. In this way, engine face 150 and air dam 100 provide substantially continuous surfaces at the upper and back segments of the radiator discharge chamber 140, which redirects flow of the heated air away from the non-radiator airflow compartment 80 and out of the of the engine compartment 37 (FIG. 2) while flowing substantially only through the radiator airflow compartment 75. This significantly reduces or prevents the fan-directed hot airflow from flowing across the components of the rear engine compartment area or non-radiator airflow compartment 80, including the engine surfaces rearward of the front engine face 150.

Referring now to FIGS. 2 and 3, air dam 100 and engine face 150 of baffle and seal system 70 are arranged so that a majority of air inlet components of an air intake system 170 of the engine 35 are housed in the non-radiator airflow compartment 80. Some air inlet components extend above the radiator airflow compartment 75, with air dam 100 acting as a heat shield to these components as well as a flow-redirecting baffle for the heated airflow. Air intake system 170 includes air cleaner inlet 175, shown as a snorkel-style inlet. A forward end of the air cleaner inlet 175 has an opening facing a forward direction toward the front of the engine compartment 37. From this opening, the air cleaner inlet 175 extends rearwardly over the cooling package 85, the fan shroud 110, and the air dam 100. Air cleaner 185 connects to a back end of the air cleaner inlet 175. Air cleaner 185 is arranged in the non-radiator airflow compartment 80 over the engine 35, toward the back of engine compartment 37. Tubing segments 190 connect the air cleaner 185 to an intake manifold of the engine 35 or, as shown in FIG. 3, to an inlet of a turbocharger of a charged air system 200. Referring now to FIG. 3, a charged air pipe 205 extends from the turbocharger over the non-radiator airflow compartment 80 by extending over the air dam 100 to an intercooler of the cooling package 85.

Figure 4:
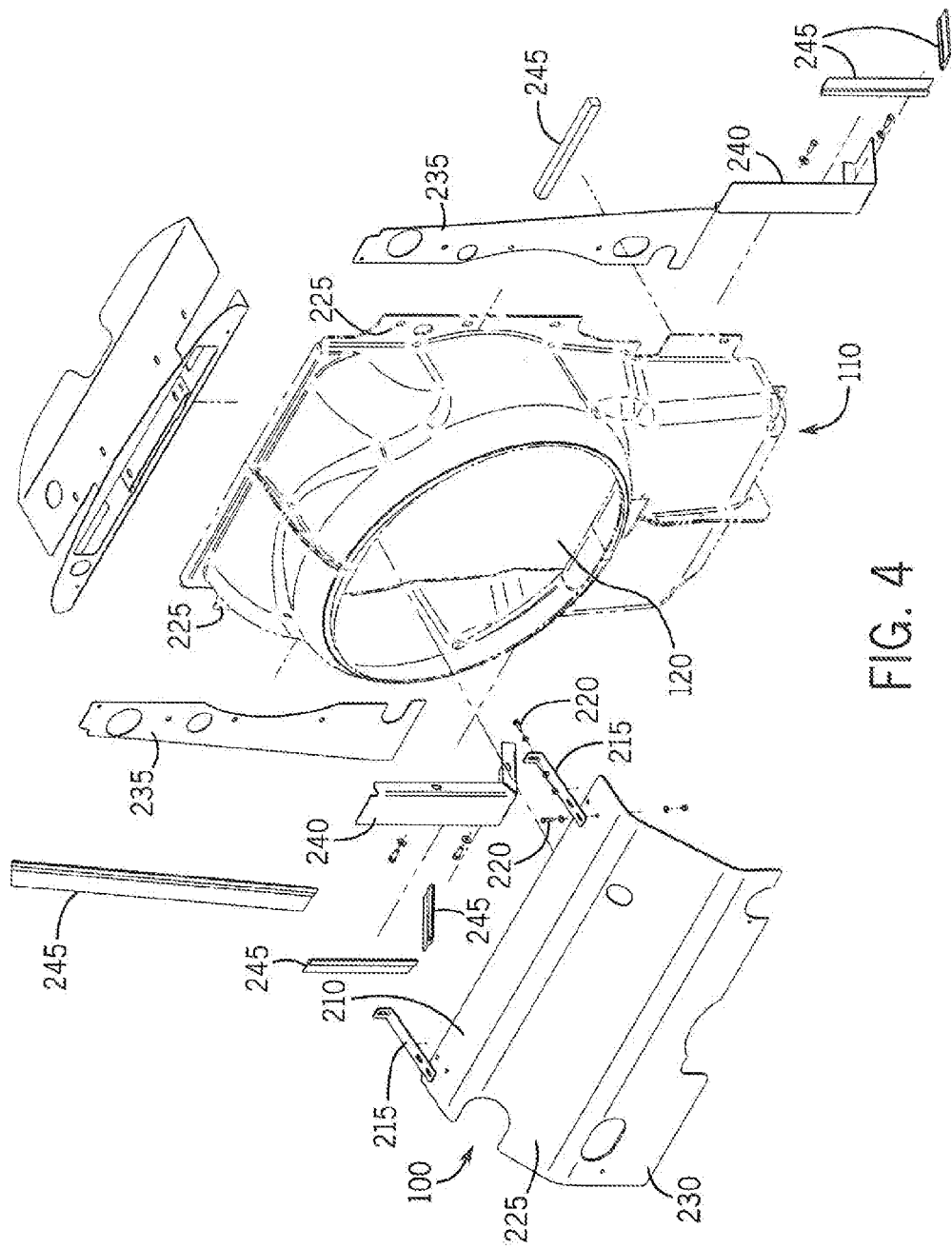
FIG. 4 is an exploded pictorial view of portions of a system for directing airflow through an engine compartment according to the present invention.

Referring now to FIG. 4, air dam 100 includes a top wall 210 extending generally horizontally away from the fan shroud 110. Brackets 215 and fasteners 220 connect the top wall 210 to shroud outer flanges 225 of the fan shroud 100. Angled wall 225 extends angularly downward and away from a rear portion of the air dam top wall 210. Back wall 230 of air dam 100 extends vertically downward from a lower portion of angled wall 225. Various baffle pieces, including side baffle pieces 235, and lower baffle pieces 240 are connected to and extend from respective portions of the shroud outer flanges 225. Various seal pieces to 245, such as foam seals, flap seals, and brush seals extend between the baffle pieces to 235, 240 and the inwardly facing surfaces of the walls of hood 38 to seal a forward end of the radiator airflow compartment 75, providing a barrier between the cooling air intake compartment 72 and the radiator airflow compartment 75 (FIG. 2).

Referring again to FIG, 2, to draw cooling air into engine compartment 37, ambient cooling air enters the cooling air intake compartment 72 through cooling air intakes shown as a front cooling air intake 260 defined by an opening through a front wall of hood 38 and a pair of side cooling air intakes 265 defined by openings through side walls 160 of hood 38. This is represented by the dashed-line arrows passing through the front and side cooling air intakes 260, 265. To discharge the heated air from engine compartment 37, the heated air from radiator 95 is restricted against flowing upwardly by the air dam 100 and restricted against longitudinal beyond the engine face 150 by the engine face 150, itself. This forces a substantially bidirectional split of the heated airflow with the heated airflow segments getting redirected transversely redirected out of the radiator discharge chamber 140, discharging sideways out of the hood 38, The discharged heated air flows out of a pair of side heated air discharges 275 defined by openings through side walls 160 of hood 38. The heated air discharges 275 define radiator discharge vents as outlets of the radiator discharge chamber 140, which are arranged rearwardly of the side cooling air intakes 265. The discharge of the heated air is represented by the dashed-line arrows passing out of the heated air discharge(s) 275, shown flowing along a flow path that is generally perpendicular with respect to a direction along which the cooling air flows through the radiator 95.

Many changes and modifications could be made to the invention without departing from the spirit thereof The scope of these changes will become apparent from the appended claims.

We claim:

1. A system for directing airflow through an engine compartment of an off-road agricultural vehicle, the system comprising:
    an engine compartment;
    an engine arranged in the engine compartment delivering power for use by the off-road agricultural vehicle;
    a radiator arranged in the engine compartment and configured to draw cooling air into an intake side of the radiator for transferring heat from the radiator to the cooling air converting the cooling air to heated air released from an discharge side of the radiator facing toward the engine;
    a radiator discharge chamber defined by a space between the engine and the discharge side of the radiator configured to receive the heated air released from the discharge side of the radiator;
    an air dam extending between the radiator and the engine, wherein the air dam defines an upper boundary of the radiator discharge chamber and is configured to vertically contain the heated air below the air darn and block flow of the heated air across an upper portion of the engine; and
    a hood with interconnected walls defining an enclosure of the engine compartment, wherein the interconnected walls of the hood include a pair of side walls with air discharges extending through the side walls.

2. The system of claim 1, wherein the air discharges define radiator discharge vents with openings extending through the side walls.

3. The system of claim 2, wherein the radiator discharge vents of the hood are arranged with respect to the radiator discharge chamber for releasing the heated air out of the radiator discharge chamber through the radiator discharge vents.

4. The system of claim 1, wherein the radiator discharge chamber is defined within a radiator airflow compartment that is arranged within the engine compartment, and wherein the air dam defined at least a portion of a boundary between the radiator airflow compartment and a non-radiator airflow compartment arranged in the engine compartment.

5. The system of claim 4, wherein the air dam includes a top wall extending generally perpendicularly from a radiator shroud directing the heated air away from the radiator.

6. The system of claim 5, wherein the air dam includes an angled wall extending angularly downward and away from a rear portion of the top wall of the air dam.

7. The system of claim 6, wherein the air darn includes a back wall extending downwardly from the angled wall of the air dam.

8. The system of claim 7, wherein the back wall of the air dam and a front wall of the engine define a rear boundary of the radiator discharge chamber.

9. The system of claim 8, wherein the air dam is configured to provide thermal separation between the heated air leaving the radiator and an air intake system of the engine.

10. The system of claim 1, wherein the off-road agricultural vehicle is a self-propelled sprayer.

11. The system of claim 1, wherein the off-road agricultural vehicle is a self-propelled spreader.

12. A self-propelled off-road agricultural vehicle comprising:
- a chassis having wheels for moving the self-propelled off-road agricultural vehicle;
- a cab supported by the chassis;
- an engine compartment;
- an engine arranged in the engine compartment delivering power for use by the off-road agricultural vehicle;
- a radiator arranged in the engine compartment and configured to draw cooling air into an intake side of the radiator for transferring heat from the radiator to the cooling air converting the cooling air to heated air released from an discharge side of the radiator facing toward the engine;
- a radiator discharge chamber defined by a space between the engine and the discharge side of the radiator configured to receive the heated air released from the discharge side of the radiator;
- an air dam extending between the radiator and the engine, wherein the air dam defines an upper boundary of the radiator discharge chamber and is configured to vertically contain the heated air below the air dam and block flow of the heated air across an upper portion of the engine; and
- a hood with interconnected walls defining an enclosure of the engine compartment, wherein the interconnected walls of the hood include a pair of side walls with air discharges extending through the side walls.

13. The self-propelled off-road agricultural vehicle of claim 12, wherein the air discharges define radiator discharge vents with openings extending through the side walls.

14. The self-propelled off-road agricultural vehicle of claim 13, wherein the radiator discharge vents of the hood are arranged with respect to the radiator discharge chamber for releasing the heated air out of the radiator discharge chamber through the radiator discharge vents.

15. The self-propelled off-road agricultural vehicle of claim 12, wherein the radiator discharge chamber is defined within a radiator airflow compartment that is arranged within the engine compartment, and wherein the air dam defined at least a portion of a boundary between the radiator airflow compartment and as non-radiator airflow compartment arranged in the engine compartment.

16. The self-propelled off-road agricultural vehicle of claim 15, wherein the air dam includes a top wall extending generally perpendicularly from a radiator shroud directing the heated air away from the radiator.

17. The self-propelled off-road agricultural vehicle of claim 16, wherein the air darn includes an angled wall extending angularly downward and away from a rear portion of the top wall of the air dam.

18. The self-propelled off-road agricultural vehicle of claim 17, wherein the air dam includes a back wall extending downwardly from the angled wall of the air dam.

* * * * *